(12) United States Patent
Tarandek et al.

(10) Patent No.: US 12,139,111 B2
(45) Date of Patent: Nov. 12, 2024

(54) BRAKE SYSTEM INCLUDING A MASTER CYLINDER WITH AN ELASTIC PEDAL FEEL ELEMENT

(71) Applicant: HL MANDO CORPORATION, Pyeongtaek-si (KR)

(72) Inventors: Kristijan Tarandek, Neu-Isenburg (DE); Hans-Jörg Feigel, Rosbach (DE); I-Che Chiang, Frankfurt am Main (DE); Priti Kumari, Frankfurt am Main (DE)

(73) Assignee: HL MANDO CORPORATION, Pyeongtaek-si (KR)

( * ) Notice: Subject to any disclaimer, the term of this patent is extended or adjusted under 35 U.S.C. 154(b) by 517 days.

(21) Appl. No.: 17/413,940

(22) PCT Filed: Dec. 16, 2019

(86) PCT No.: PCT/KR2019/017833
§ 371 (c)(1),
(2) Date: Jun. 14, 2021

(87) PCT Pub. No.: WO2020/122690
PCT Pub. Date: Jun. 18, 2020

(65) Prior Publication Data
US 2022/0089136 A1    Mar. 24, 2022

(30) Foreign Application Priority Data
Dec. 14, 2018   (DE) .................... 10 2018 221 761.0

(51) Int. Cl.
*B60T 13/14*   (2006.01)
*B60T 13/68*   (2006.01)
(Continued)

(52) U.S. Cl.
CPC .......... *B60T 13/142* (2013.01); *B60T 13/686* (2013.01); *B60T 13/745* (2013.01); *B60T 17/22* (2013.01); *B60T 2270/406* (2013.01)

(58) Field of Classification Search
CPC .......... B60T 7/04; B60T 8/4086; B60T 8/409; B60T 8/4072; B60T 13/142;
(Continued)

(56) References Cited

U.S. PATENT DOCUMENTS

| 5,729,979 A | 3/1998 | Shaw et al. |
| 8,424,976 B2 | 4/2013 | Dinkel et al. |

(Continued)

FOREIGN PATENT DOCUMENTS

| DE | 102017210078 A1 * | 1/2018 | ................ B60T 8/38 |
| FR | 2861037 A1 * | 4/2005 | ............ B60T 11/165 |

(Continued)

OTHER PUBLICATIONS

Machine translation, DE 102017210078 A1. (Year: 2018).*
(Continued)

*Primary Examiner* — Thomas J Williams
(74) *Attorney, Agent, or Firm* — Hauptman Ham, LLP

(57) ABSTRACT

The present invention relates to a brake system comprising a brake pedal; a master cylinder including a first master chamber, a second master chamber, a first master piston, and a second master piston; a first hydraulic circuit; a second hydraulic circuit; a hydraulic pressure supplier including an actuator for pressurizing the first hydraulic circuit and the second hydraulic circuit depending on an operation of the brake pedal in a normal operating mode of the brake system; and an elastic pedal feel element arranged in the first master chamber to be in contact with the first master piston and the second master piston for generating a pedal force when the
(Continued)

brake pedal is operated while the second master piston is locked in the normal operating mode.

14 Claims, 2 Drawing Sheets

(51) Int. Cl.
*B60T 13/74* (2006.01)
*B60T 17/22* (2006.01)

(58) Field of Classification Search
CPC ...... B60T 13/686; B60T 13/745; B60T 17/22; B60T 2270/406; B60T 2270/82; F16B 13/14
See application file for complete search history.

(56) References Cited

U.S. PATENT DOCUMENTS

| | | | | |
|---|---|---|---|---|
| 2002/0153215 | A1* | 10/2002 | Kusano | B60T 13/145 188/359 |
| 2004/0004392 | A1 | 1/2004 | Kusano | |
| 2010/0283315 | A1* | 11/2010 | Isono | B60T 8/4086 303/9.75 |
| 2014/0131154 | A1* | 5/2014 | Ganzel | B60T 13/588 303/14 |
| 2014/0159473 | A1 | 6/2014 | Kuhlman | |
| 2017/0158184 | A1 | 6/2017 | Choi et al. | |
| 2017/0327098 | A1 | 11/2017 | Leiber et al. | |
| 2018/0334149 | A1 | 11/2018 | Feigel | |
| 2019/0152456 | A1* | 5/2019 | Schiel | B60T 8/38 |
| 2019/0329751 | A1* | 10/2019 | Jeong | B60T 11/20 |
| 2021/0309198 | A1* | 10/2021 | Tarandek | B60T 13/686 |
| 2022/0032889 | A1* | 2/2022 | Tarandek | B60T 13/142 |

FOREIGN PATENT DOCUMENTS

| | | | | |
|---|---|---|---|---|
| JP | 2006-256408 A | | 9/2006 | |
| WO | WO-2020122689 A1 | * | 6/2020 | ........... B60T 13/142 |

OTHER PUBLICATIONS

FR-2861037-A1 (Year: 2005).*
International Search Report dated Apr. 10, 2020 for corresponding International Patent Application No. PCT/KR2019/017833.
Written Opinion dated Apr. 9, 2020 for corresponding International Patent Application No. PCT/KR2019/017833.

* cited by examiner

BRAKE SYSTEM INCLUDING A MASTER CYLINDER WITH AN ELASTIC PEDAL FEEL ELEMENT

CROSS-REFERENCE TO RELATED APPLICATION

The present application is a national stage filing under 35 U.S.C § 371 of PCT application number PCT/KR2019/017833 filed on Dec. 16, 2019 which is based upon and claims the benefit of priorities to German Patent Application No. 10 2018 221 761.0, filed on Dec. 14, 2018, in the German Intellectual Property Office, which is incorporated herein in its entirety by reference.

TECHNICAL FIELD

The present invention relates to a brake system. More particularly, the invention relates to a brake system comprising a hydraulic pressure supplier for pressurizing hydraulic circuits depending on an operation of a brake pedal in a normal operating mode of the brake system.

BACKGROUND ART

A conventional powered braking system is shown for example in FIG. 1 of US 2014/0159473 A1. In such a conventional brake system, a pedal travel sensor is coupled to a brake pedal and operable to detect an amount of travel of the brake pedal, so that a corresponding signal can be sent to a controller. The controller interprets the signal and sends a further signal to a hydraulic pressure supplier including an actuator. In turn, the actuator pressurizes braking fluid to operate hydraulic wheel brakes. Furthermore, a separate pedal feel simulator is provided to mimic the feel and travel present during braking of a conventional braking system that supplies fluid directly from a master cylinder to wheel cylinders.

However, the design of such conventional braking systems can be rather complicated and space consuming due to a relatively large number of parts.

DISCLOSURE

Technical Problem

It is the object of the present invention to provide a compact braking system, preferably having a reduced number of parts. Furthermore, it would be advantageous to reduce manufacturing costs of the braking system.

Technical Solution

The present invention has been made to solve at least one of the above mentioned objects.

Accordingly, a brake system is provided, comprising a brake pedal; a master cylinder including a first master chamber, a second master chamber, a first master piston, and a second master piston, the first master piston being directly displaceable by operating the brake pedal and the second master piston being a floating piston and separating the first master chamber, which is between the first master piston and the second master piston, from the second master chamber; a first hydraulic circuit including at least one first hydraulic wheel brake; a second hydraulic circuit including at least one second hydraulic wheel brake; and a hydraulic pressure supplier including an actuator for pressurizing the first hydraulic circuit and the second hydraulic circuit depending on an operation of the brake pedal in a normal operating mode of the brake system.

The first master chamber is hydraulically connected to the first hydraulic circuit for pressurizing the first hydraulic circuit in an emergency mode of the brake system.

The second master chamber is hydraulically connected to the second hydraulic circuit via a first cut-off valve for pressurizing the second hydraulic circuit in the emergency mode when the first cut-off valve is open, while the second master piston can be locked in a locking position by closing the first cut-off valve in the normal operating mode.

Furthermore, an elastic pedal feel element is arranged in the first master chamber to be in contact with the first master piston and the second master piston for generating a pedal force when the brake pedal is operated while the second master piston is locked in the normal operating mode.

As the second master piston is locked in the normal operating mode, said second master piston is not displaceable in the normal operating mode. Thus, a volume of the second master chamber can be substantially constant in the normal operating mode. When the brake pedal is operated in the normal operating mode, the first master piston is advanced towards the second master piston thereby resulting in a deformation of the elastic pedal feel element. The driver thus experiences a counterforce when the brake pedal is operated. In the proposed brake system, the elastic pedal feel element can mimic the pedal force of a conventional braking system during a braking action. Thus, the elastic pedal feel element can function as a pedal simulator. As the elastic pedal feel element is integrated in the master cylinder, no separate pedal simulator or additional switching or locking valves are required. Therefore, compared with conventional brake systems a compact brake system having a reduced number of parts can be provided.

The emergency mode may be used as a back-up mode/hydraulic fall-back mode, for instance when there is a power failure or when the hydraulic pressure supplier or one or more electrically actuated valves do not function properly. In the emergency mode braking fluid can be supplied directly from the master cylinder to the hydraulic wheel brakes. Thus, not only does the brake system provide a master cylinder with an integrated pedal simulator in the normal operating mode, the brake system may also allow operating at least some of the hydraulic wheel brakes in case of an emergency.

The second master piston can be unlocked in the emergency mode. In this way, the second master piston can be displaced thereby changing a volume of the second master chamber. Thus, the first cut-off valve can be opened in the emergency mode to establish a hydraulic connection between the second master chamber and the second hydraulic circuit. As the second master chamber is hydraulically connected to the second hydraulic circuit in the emergency mode, the second hydraulic circuit can be pressurized directly upon operation of the brake pedal. Preferably, the hydraulic connection between the pressure supplier and the hydraulic circuits is blocked in the emergency mode, e.g. by dedicated check valves or normally closed cut-off valves.

A spring may be arranged in the second master chamber biasing the second master piston towards the first master piston and towards the locking position. The spring may facilitate urging the second master piston back to its locking position when changing from the emergency mode to the normal operating mode and/or when changing from a brake position towards a non-braking position in the emergency mode. The non-braking position (also called rest position) of the second master piston in the emergency mode may correspond to the locking position of the second master piston in the normal operating mode.

Optionally, the brake system further comprises a reservoir for storing a brake fluid. In one embodiment, the first master chamber may be hydraulically connected to the reservoir via a second cut-off valve. The second cut-off valve can be opened in the normal operating mode. The fluid displaced by the first master piston in the first master chamber may be directed to the reservoir via the second cut-off valve. This implementation may prevent building-up pressure in the first master chamber during a braking action in the normal operating mode and may facilitate the usage of the pedal simulator.

It can be envisaged that the first cut-off is a normally open valve (NO valve). The second cut-off valve may be a normally closed valve (NC valve). Further, the first and/or second cut-off valves can be electrically operable, e.g. by corresponding control signals from a control unit (see below). Optionally, the first and/or second cut-off valves may be solenoid valves.

In one embodiment, a first pressure relief path for depressurizing the first hydraulic circuit in the normal operating mode hydraulically connects the first hydraulic circuit to the reservoir via the first master chamber and the second cut-off valve. It can be envisaged that a part of the first pressure relief path connects the first master chamber to the first hydraulic circuit for pressurizing the first hydraulic circuit in the emergency mode. In other words, the first pressure relief path between the first hydraulic circuit and the first master chamber includes the same hydraulic fluid line or the same hydraulic fluid lines as the hydraulic connection between the first hydraulic circuit and the first master chamber for pressurizing the first hydraulic circuit in the emergency mode.

Additionally or alternatively, a second pressure relief path for depressurizing the second hydraulic circuit in the normal operating mode hydraulically connects the second hydraulic circuit to the reservoir. Typically, the second pressure relief path from the second hydraulic circuit to the reservoir bypasses the master cylinder, i.e. does not include any parts of the master cylinder. In other words, different hydraulic fluid lines may be used for the second pressure relief paths in the normal operating mode and the hydraulic connection between the second master chamber and the second hydraulic circuit for pressurizing the second hydraulic circuit in the emergency mode.

The first and/or second hydraulic circuits may comprise two cut-off valves per hydraulic wheel brake. Said cut-off valves may be a pressure supply valve for pressurizing the corresponding hydraulic wheel brake and a pressure relief valve for depressurizing the hydraulic wheel brake. The pressure relief valve may hydraulically connect the hydraulic circuit and the corresponding pressure relief path. The pressure supply valve may hydraulically connect the hydraulic circuit and the hydraulic pressure supplier. While both cut-off valves may be normally open valves in the first hydraulic circuit, the pressure supply valve may be a normally open valve and the pressure relief valve may be a normally closed valve in the second hydraulic circuit.

The elastic pedal feel element may be made of an elastomer. The elastic pedal feel element may comprise a body, which may be a solid body. Furthermore, the body of the elastic pedal feel element may be an elongated body having a first axial end portion, an opposing second axial end portion and an intermediate portion therebetween. Furthermore, a longitudinal direction of the elongate body may be axially aligned with the master cylinder. Optionally, a centreline of the elongate body may coincide with a centreline of the master cylinder. The first axial end portion of the body may be in contact with the first master piston, while the second axial end portion of the body may be in contact with the second master piston. The elastic pedal feel element may comprise a progressive spring characteristic. In this way, the pedal travel and feel experienced by the driver may be improved. The body may include a tapered portion. For instance, the second end portion may be tapered. The intermediate portion may be cylindrical in shape and may have a constant diameter. The first end portion may have a diameter that is greater than the diameter of the intermediate portion and the second axial end portion. The first master piston and/or the second master piston may each include a recess that receives at least a part of the elastic pedal feel element. The corresponding recess may be formed such to allow the elastic pedal feel element to be compressed in the axial direction, i.e. expanded in a radial direction inside the recess. When the brake pedal is completely depressed, the elastic pedal feel element may be deformed such to snugly fit in the recess. The elastic pedal feel element can be designed for a compressive loading.

In one implementation form, the brake system comprises a pedal sensor for detecting an operation of the brake pedal. Furthermore, the brake system may comprise a control unit. The control unit may be configured to perform a number of different actions. For instance, the control unit may be envisaged for activating the hydraulic pressure supplier and/or controlling valves of the brake system. The control unit may activate hydraulic pressure supplier and/or control the valves depending on sensor signals of the pedal sensor. The control unit may be configured to control valves comprised by the first and the second hydraulic circuit, the first cut-off valve, the second cut-off valve, a third cut-off valve and/or a fourth cut-off valve (see below). The control of the valves may depend on the operating mode of the brake system, e.g. the normal operating mode, the emergency mode or a self-test during the normal operating mode (see below).

For instance, the control unit may be configured for keeping the first cut-off valve closed and the second cut-off valve open in the normal operating mode and/or for opening the first cut-off valve and closing the second cut-off valve in order to switch the brake system in the emergency mode when a failure is detected.

Optionally, a brake fluid supply path may hydraulically connect the reservoir and an inlet of the first master chamber, the inlet being open when the first master piston is in a rest position and closed when the first master piston is moved out of the rest position by the brake pedal.

In a further embodiment, a third cut-off valve may be arranged in the brake fluid supply path between the reservoir and the inlet of the first master chamber. In exemplary embodiments, the third cut-off valve is a normally open valve. The third cut-off valve may be a hydraulically operated valve. The hydraulic pressure required for closing the third cut-off valve may be supplied directly by the hydraulic pressure supplier.

The control unit may be configured for performing a self-test of the brake system by closing the third cut-off valve and by pressurizing the first master chamber and/or a seal region of the first master chamber in the normal operating mode. Optionally, the control unit is configured to simultaneously close the second cut-off valve and the third cut-off valve, and preferably to subsequently open the second cut-off valve during the self-test, e.g. after pressurizing the seal region. After pressurizing the seal region, the control unit may be configured to disconnect a hydraulic connection for pressurizing the first master chamber and/or the seal region.

In a further exemplary embodiment, the inlet of the first master chamber is arranged between a primary sealing member and a secondary sealing member. The sealing members may be disposed between the first master piston and an inner wall of the master cylinder. The primary and/or secondary sealing members may be disposed each in a corresponding annular groove formed in the inner wall of the master piston.

The primary sealing member may be configured to provide a sealing between the first master piston and the master cylinder to prevent the brake fluid from coming out of the master cylinder at least when the first master piston is moved out of the rest position. The secondary sealing member may be configured to provide a sealing between the first master piston and the master cylinder to prevent the brake fluid from coming out of the master cylinder at least in a rest position of the first master piston.

A pressure test path may define a pressure path during the self-test. The pressure test path may include a hydraulic connection between the first master chamber and the first hydraulic circuit for pressurizing the first master cylinder and/or the seal region during the self-test. Preferably, the hydraulic connection between the first master chamber and the first hydraulic circuit of the pressure test path during the normal operating state equals the hydraulic connection of the first master chamber and the first hydraulic circuit in the emergency mode. In alternative embodiments, said hydraulic connections may differ from each other. Alternatively, the pressure test path may include a direct hydraulic connection between the first master chamber and the hydraulic pressure supplier for pressurizing the first master cylinder and/or the seal region during the self-test. After the first master cylinder and/or the seal region have been pressurized, the control unit may close valves in the hydraulic connection for pressurizing the first master cylinder and/or the seal region thereby disconnecting said hydraulic connection.

In a further development, the brake system may comprise an auxiliary sealing member, disposed between the first master piston and the inner wall of the master cylinder. A pressure test chamber may be axially delimited by the auxiliary sealing member and the primary sealing member. The pressure test chamber may be used for testing the primary sealing member during the self-test. The pressure test chamber may have an annular shape and/or may surround the first master piston. The pressure test chamber may be located between an outer surface of the first master piston and the inner wall of the master cylinder. The auxiliary sealing member and the secondary sealing member may be disposed on opposite sides of the primary sealing member.

The auxiliary sealing member may be disposed between the first master piston and an inner wall of the master cylinder. For instance, the auxiliary sealing member may be disposed in a corresponding annular groove formed in the inner wall of the master piston. The auxiliary sealing member may allow pressurized braking fluid to flow from the first master chamber into the pressure test chamber through the auxiliary sealing member, while it prevents pressurized brake fluid from flowing back from the pressure test chamber into the first master chamber.

Furthermore, the pressure test path may include a hydraulic connection between the reservoir and the pressure test chamber for depressurizing the pressure test chamber, e.g. at the end of the self-test. Optionally, the pressure test path between the reservoir and the pressure test chamber includes a first check valve and/or a fourth cut-off valve. The fourth cut-off valve may be an electrically operated valve, and is typically controlled by the control unit. Moreover, the fourth cut-off valve may be a normally closed valve.

It should be mentioned that the seal region may comprise the region of the master cylinder in which the at least the primary sealing member, the secondary sealing member and/or the auxiliary sealing member are disposed. The seal region may e.g. comprise or consist of the pressure test chamber.

At least one pressure sensor may be envisaged for measuring the pressure of the brake fluid in the first master chamber and/of the seal region and/or the pressure test chamber during the self-test. The at least one pressure sensor may send the measurement results to the control-unit.

Advantageous Effects

The brake system including a master cylinder with an elastic pedal feel element according to the various embodiments of the present disclosure may be used for a compact braking system, preferably having a reduced number of parts. Furthermore, it would be advantageous to reduce manufacturing costs of the braking system.

DESCRIPTION OF DRAWINGS

Various objects and advantages of the present invention will become apparent to those skilled in the art from the following detailed description of embodiments, when read in light of the accompanying drawings.

There are shown in

BEST MODE

Figure 1:
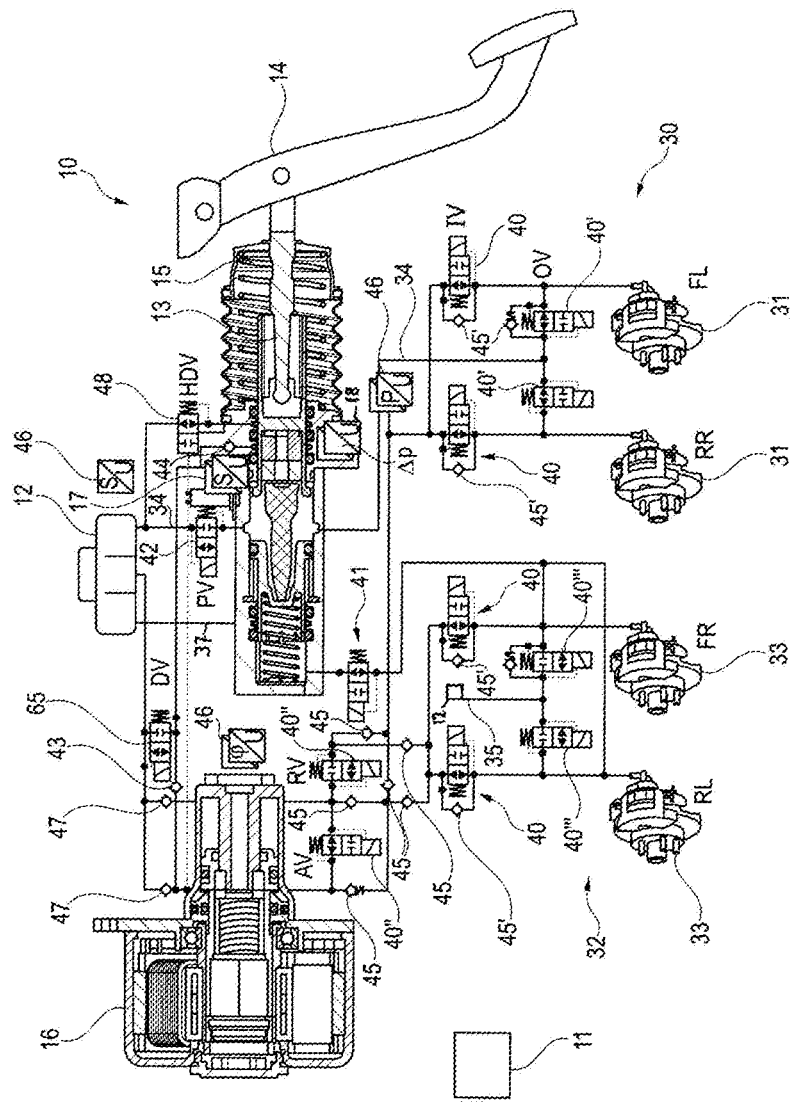
FIG. 1 a schematic diagram of a brake system.

In the following, recurring and similar features in this and in the subsequent representations are provided with the same reference numerals.

FIG. 1 shows a schematic diagram of a brake system 10. The illustrated system 10 is provided with dual hydraulic circuits 30, 32 each including two hydraulic wheel brakes 31, 33. The number of hydraulic wheel brakes 31, 33 per hydraulic circuit may vary. For instance a higher number (e.g. three or more) or smaller number (e.g. one) of wheel brakes 31, 33 per hydraulic circuit are also contemplated by the present invention. The brake system 10 comprises a brake pedal 14, a return spring 15 biasing the brake pedal 14 in the return direction towards a rest position and an input rod 13 connected to the brake pedal 14. In the brake system 10 of FIG. 1, a brake pedal travel sensor 17 is operable to detect a parameter that corresponds to an amount of travel of the brake pedal 14, so that a corresponding signal can be sent to a controller 11. The controller 11 may send a signal to a hydraulic pressure supplier 16 which comprises an actuator for pressurizing brake fluid to operate the hydraulic wheel brakes 31, 33 depending on an operation of the brake pedal in a normal operating mode of the brake system 10. The brake fluid is stored in reservoir 12 that is hydraulically connected to the pressure supplier 16 by dedicated fluid lines and via two check valves 47.

The first and second hydraulic circuits 30, 32 comprise a plurality of cut-off valves 40, 40', 40''' that can be selectively controlled by the controller 11. The cut-off valves 40, 40', 40''' may be 2/2 way solenoid valves. The cut-off valves 40 are positioned between the pressure supplier 16 and each of the hydraulic wheel brakes 31, 33 such that movement of hydraulic fluid from the pressure supplier 16 and to the hydraulic wheel brakes 31, 33 can be selectively enabled and selectively blocked via operation of the cut-off valves 40. Furthermore, the cut-off valves 40', 40''' are positioned between the hydraulic wheel brakes 31, 33 and the reservoir 12 such that movement of hydraulic fluid from the hydraulic wheel brakes 31, 33 and to the reservoir 12 can be selectively enabled and selectively blocked via operation of the cut-off valves 40', 40'''. The first and second hydraulic circuits 30, 32 may also comprise a plurality of check valves 45'. Furthermore, a plurality of cut-off valves 40'' that may be designed as 2/2 way solenoid valves and a plurality of check valves 45 are located between the pressure supplier 16 and the first and second hydraulic circuits 30, 32. To improve control and enable self-testing of the brake system 10, several parameters may be monitored by a plurality of sensors 46, 17, such as pressure, angular and distance sensors. The output of the sensors 46 is directed to the controller 11.

The operation of the first and second hydraulic circuits 30, 32 in combination with the hydraulic pressure supplier 16 may be apparent for the skilled person from FIG. 1 and not outlined in detail for the sake of brevity.

Thus, in the normal (powered) operation mode of the brake system 10, depression of the brake pedal 14 does not directly apply braking force to the hydraulic wheel brakes 31, 33 through the brake fluid, but rather, the brake fluid is provided to the hydraulic wheel brakes 31, 33 by the hydraulic pressure supplier 16 and control of the solenoid valves 40, 40', 40''' in the first and second hydraulic circuits 30, 32.

The brake system 10 further comprises a master cylinder 20 that performs two functions, namely operation of the hydraulic wheel brakes 31, 33 in an emergency mode and simulation of the brake pedal 14 in the normal operating mode. These functions will become apparent from the following description.

Figure 2:
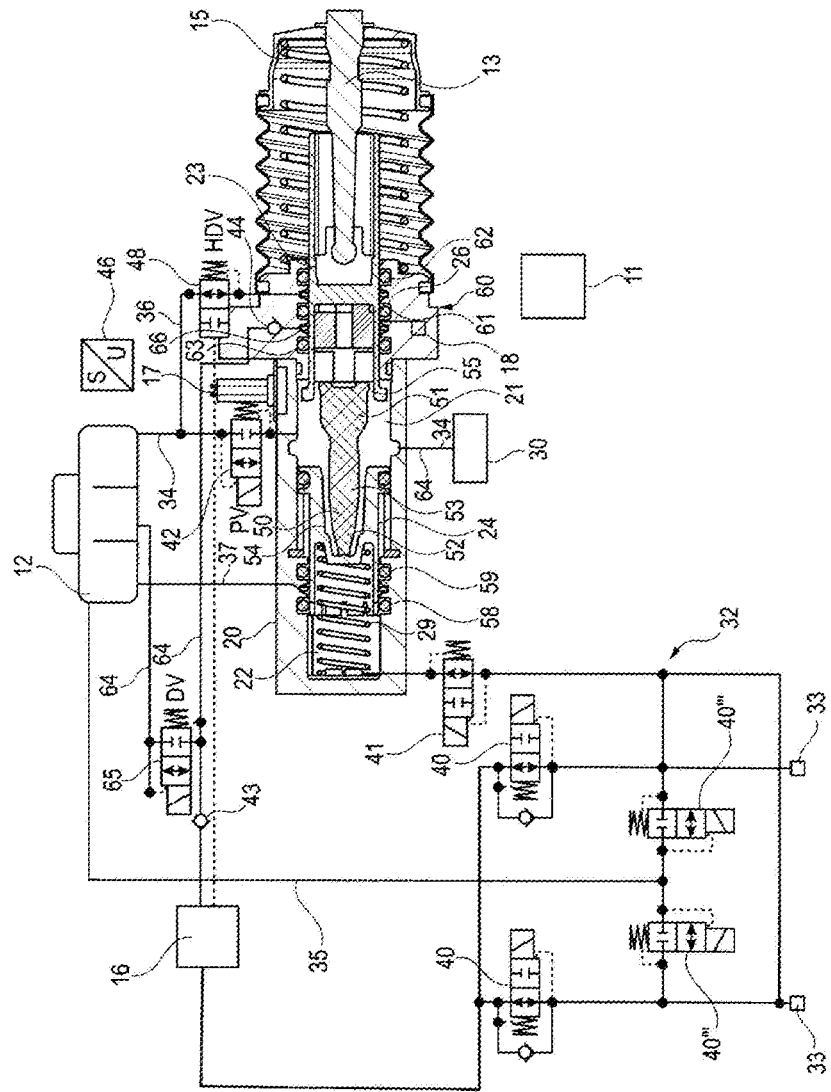
FIG. 2 a portion of the brake system of FIG. 1.

As can be seen from FIG. 2, the master cylinder 20 includes a first master chamber 21, a second master chamber 22, a first master piston 23, and a second master piston 24. The first master piston 23 is configured to be moveable under the brake operating force transmitted from the brake pedal 14 through the input rod 13. Thus, the first master piston 23 is directly displaceable by operating the brake pedal 14. The first master chamber 21 is hydraulically connected to the first hydraulic circuit 30 for pressurizing the hydraulic circuit 30 in an emergency mode of the brake system 10 (see below).

The second master piston 24 is a floating piston that separates the first master chamber 21, which is between the first master piston 23 and the second master piston 24, from the second master chamber 22. The second master chamber 22 is hydraulically connected to the second hydraulic circuit 32 via a first cut-off valve 41 for pressurizing the second hydraulic circuit 32 in an emergency mode, when the first cut-off valve 41 is open. The second master piston 24 can be locked in a locking position by closing the first cut-off valve 41 in the normal operating mode. A coil spring 29 is arranged in the second master chamber 22 biasing the second master piston 24 towards the first master piston 23 and towards the locking position. Optionally, the first master chamber 21 is hydraulically connected to the reservoir 12 via a second cut-off valve 42. The first cut-off valve 41 may be a normally open valve (NO valve) whereas the second cut-off 42 valve may be a normally closed valve (NC valve).

The first and second cut-off valves 41, 42 may be solenoid valves that can be electrically actuated and controlled by the controller 11. Moreover, the first and second cut-off valves 41, 42 may be 2/2 way valves having two connections and two valve positions.

Furthermore, an elastic pedal feel element 50 is arranged in the first master chamber 21 for generating a pedal force when the brake pedal 14 is operated in the normal operating mode. The elastic pedal feel element is disposed between the first master piston 23 and the second master piston 24. Preferably, the elastic pedal feel element 50 may be integrally formed of an elastomer, such as rubber or silicone. In particular, the elastic pedal feel element 50 is designed for a compression force and has a progressive spring characteristic.

The elastic pedal feel element 50 may comprise an elongate, solid body. A longitudinal direction of the elongate body may be axially aligned with the master cylinder 20. In the embodiment shown, a centreline of the elongate body coincides with a centreline of the master cylinder 20. Furthermore, the body includes a first axial end portion 51, an opposing second axial end portion 52 and an intermediate portion 53 therebetween. The first axial end portion 51 of the body is in contact with the first master piston 23, while the second axial end portion 52 of the body is in contact with the second master piston 24.

The second end portion 52 may be tapered and optionally has a conical shape. The intermediate portion 53 may be cylindrical in shape and may have a substantially constant diameter. The first end portion 51 has a diameter that is greater than the diameter of the intermediate portion 53 and the second axial end portion 52. The second master piston 24 may include a recess 54 that receives the second axial end portion 52 and a part of the intermediate portion 53. The recess 54 may be formed such to allow the elastic pedal feel element 50 to be compressed in the axial direction and expanded in a radial direction inside the recess 54. When the brake pedal 14 is completely depressed, the elastic pedal feel element 50 is deformed such to snugly fit in the recess 54 of the second master piston 24. The first axial end portion 51 is formed to fit in a recess 55 formed by the first master piston 23. In both the normal operating mode and the emergency mode, the elastic pedal feel element 50 is retained between the first and second master pistons 23, 24.

In the following description, the normal operating mode and the emergency mode are described.

In the normal operating mode (powered operating mode), the first cut-off valve 41 is in its closed position, whereas the second cut-off valve 42 is in its open position. As a result, the second master piston 24 is locked in its locking position. When a user or driver depresses the brake pedal 14, the input rod 13 pushes the first master piston 24 further into the master cylinder 20. As the second master piston 24 is locked, the elastic pedal element 50 is compressed between the first master piston 23 and the second master piston 24. As a result, the driver experiences a brake pedal feel that he/she would also experience when operating a conventional brake system being solely hydrau-lically actuated during a brake action. In addition, the brake fluid inside the first chamber 21 is directed via the opened cut-off valve 42 to the reservoir 12.

The controller 11 sends a signal to a hydraulic pressure supplier 16 depending on the position of the brake pedal 14. Furthermore, the controller 11 controls and operates the cut-off valves 40, 40', 40''' of the first and second hydraulic circuits 30, 32 such that the first and second hydraulic circuits 30, 32 are pressurized and the hydraulic wheel brakes 31, 33 can be applied. More specifically, the valves 40 are opened while the valves 40', 40''' are closed so that the hydraulic wheel brakes 31, 33 can be operated. When the user or driver releases the brake pedal 14, the return spring 15 urges the brake pedal 14 towards its non-braking default position (rest position).

Optionally, a first pressure relief path 34 is formed from the first hydraulic circuit 30 to the reservoir 12 via the first master chamber 21 and the second cut-off valve 42 in the normal operating mode. A second pressure relief path 35 is formed from the second hydraulic circuit 32 directly to the reservoir 12. The brake pedal sensor 17 senses that the brake pedal 14 returns to its default state and sends this information to the controller 11. Thereafter, the controller 11 controls and operates the cut-off solenoid valves 40, 40', 40''' in the first and second hydraulic circuits 30, 32 such that the hydraulic connection to the pressure supplier 16 is blocked and the brake fluid is directed from the first and second hydraulic circuits 30, 32 via the pressure relief paths 34, 35 to the reservoir 12. More specifically, the cut-off valves 40 between the hydraulic pressure supplier 16 and the wheel brakes 31, 33 are closed, while the cut-off valves 40', 40''', 42 between the wheel brakes 31, 33 and the reservoir 12 are opened. Thus, the brake fluid is directed from the hydraulic circuits 30, 32 and the hydraulic wheel brakes 31, 33 to the reservoir 12 via pressure relief paths 34, 35.

The reservoir 12 may be hydraulically connected to the first master chamber 21 and/or the second master chamber 22 by fluid lines 36, 37 (brake fluid supply paths 36, 37), respectively, for filling the respective chambers 21, 22 after a braking action. By this arrangement the first master chamber 21 and/or the second master chamber 22 can be filled with brake fluid when the first master piston 23 and/or the second master piston 24 are in their rest positions. The fluid lines 36, 37 are connected to an inlet of the first master chamber 21 and an inlet of the second master chamber 22. The corresponding inlet is open when the first master piston 23 (or second master piston 24) is in a rest position and closed when the first master piston 23 (or second master piston 24) is moved out of the rest position by the brake pedal 14. The inlet of the first master chamber 21 may be axially located between two adjacent sealing members 61, 62 (see FIG. 2). Furthermore, the inlet of the second master chamber 22 is axially arranged between two sealing members 58, 59.

In the implementation form shown in FIGS. 1 and 2, an optional third cut-off valve 48 is situated in the brake fluid supply path 36 between the reservoir 12 and the inlet of the first master chamber 21 and may be used for testing the sealing between the first master piston 23 and the master cylinder 20 in the normal operating mode. The third cut-off valve 48 may be a hydraulically operated valve. Furthermore, the third cut-off valve 48 may be a normally open valve. As can bee seen in FIGS. 1 and 2, the hydraulic pressure required for closing the third cut-off valve 48 may be supplied by the hydraulic pressure supplier 16.

Optionally, a seal region 60 of the master cylinder 20 at the first master chamber 21 comprises a plurality of sealing members 61, 62, 63 between the first master piston 23 and of an inner wall 26 of the master cylinder 20. In the following, these sealing members 61, 62, 63 may be designated as primary sealing member 61, secondary sealing member 62 and auxiliary sealing member 63. Usually, each of the sealing members 61, 62, 63 has an annular shape and surrounds the first master piston 23. The sealing members 61, 62, 63 are typically arranged in annular grooves formed in the inner wall 26 of the master cylinder 20. The seal region 60 further comprises a pressure test chamber 66 between the first master piston 21 and the inner wall 26 of the master cylinder 20. The pressure test chamber 66 is axially delimited by the auxiliary sealing member 63 and the primary sealing member 61.

The sealing members 61, 62, 63 may have a preferred sealing direction and are fluid tight when the pressurized braking fluid presses the sealing members 61, 62, 63 in the preferred sealing direction. In particular, the auxiliary sealing member 63 may allow pressurized braking fluid to flow from the first master chamber 21 into the pressure test chamber 66 through the auxiliary sealing member 63, while it prevents pressurized brake fluid from flowing from the pressure test chamber 66 in the direction of the second master chamber 22. Thus, the auxiliary sealing member 63 may be configured, together with the primary sealing member 61, to keep a pressure in the pressure test chamber 66 constant e.g. after the pressure test chamber 66 has been pressurized. At least one pressure sensor 18 may be envisaged for measuring the pressure of the brake fluid in the pressure test chamber 66 during the self-test.

The self-test may in particular be performed during the normal operating mode. Furthermore, the self-test may be performed when the vehicle is in a standstill position, e.g. just before or right after driving. The self-test may be also performed during maintenance of the vehicle, e.g. when the vehicle is in a workshop.

The controller 11 may be configured for performing the self-test of the brake system 10 by closing the second cut-off valve 41 and third cut-off valve 48. The controller 11 controls the hydraulic pressure supplier 16 and the first hydraulic circuit 30 such that the first master chamber 21 is pressurized via the test pressure path 64 between the first master chamber 21 and the first hydraulic circuit 30. By virtue of the special arrangement of the sealing members 61, 63 pressurized brake fluid is introduced from the first pressure chamber 21 into the pressure test chamber 66 via the auxiliary sealing member 63. At the same time, the pressure supplier 16 pressurizes the fluid line between the fourth cut-off valve 65 and the check valve 44. As a consequence, the pressure inside the pressure test chamber 66, i.e. between the primary and auxiliary sealing members 61, 63 may now equal the pressure that is provided by the hydraulic pressure supplier 16.

In a next step, the valves 40' of the first hydraulic circuit 30 are closed. Then, the second cut-off valve 42 and the third cut-off valve 48 are opened. As a result, the first master chamber 21 is depressurized via pressure relief path 34. However, due to the primary sealing member 61 and the auxiliary sealing member 63 the brake fluid inside the pressure test chamber 66 maintains pressurized when the sealing member 61 properly functions. The pressure inside the pressure test chamber 66 is monitored by the pressure sensor 18 and the measurement results are directed to the controller 11. If the pressure inside the pressure test chamber 66 drops during the self-test, this is indicative of an untight primary sealing member 61. Based on the measurement results of the pressure sensor 18, the controller 11 is configured to determine whether or not the pressure test chamber 66 and/or the primary sealing member 61 is leaktight.

Preferably, the pressure test path 64 further includes a hydraulic connection between the reservoir 12 and the pressure test chamber 66 for depressurizing the pressure test chamber 66 at the end of the self-test. The pressure test path 64 between the reservoir 12 and the pressure test chamber 66 includes a fourth cut-off valve 65 and an optional check valve 44. The check valve 44 may prevent the sealing region 60, particularly the pressure test chamber 66, from being unnecessarily pressurized by the hydraulic pressure supplier 16 in the normal operation mode of the brake system 10. The fourth cut-off valve 65 is a normally closed valve and can be electrically operated by the controller 11.

At the end of the self-test, the controller 11 operates the fourth cut-off valve 65 to release the pressure in the pressure test chamber 66. The pressurized hydraulic brake fluid is then directed via the check valve 44, the pressure test path 64 and the fourth cut-off valve 65 to the reservoir 12. Thus, at the end of the self-test, the pressure test chamber 66 is depressurized. A check valve 43 may be positioned in the hydraulic connection between the pressure test chamber 66 and the hydraulic pressure supplier 16. The check valve 43 may ensure that the hydraulic brake fluid is not directed to the pressure supplier 16 but instead to the reservoir 12 at the end of the self-test. Alternatively, instead of check valves 43 and 44 a further electrically operable cut-off valve (not shown) may be disposed between the hydraulic pressure supplier 16 and the pressure test chamber 66.

In the emergency operating mode (non-powered operating mode), the first cut-off valve 41 is in its opened position, whereas the second cut-off valve 42 is in its closed position. The cut-off valves 40, 40', 40''' and the check valves 45' of the first and second hydraulic circuits 30, 32 as well as the cut-off valves 40'' and the check valves 45 between the hydraulic circuits 30, 32 and the pressure supplier 16 are designed such that the hydraulic connection between the pressure supplier 16 and the hydraulic circuits 30, 32 is blocked in the emergency mode. The cut-off valves 40, 40' are normally open valves and are opened in the emergency mode, while the cut-off valves 40''' of the second hydraulic circuit are normally closed valves and are closed in the emergency mode. Moreover, the first master chamber 21 is hydraulically connected to the first hydraulic circuit 30 for pressurizing the first hydraulic circuit 30 in an emergency mode of the brake system 10. Furthermore, the second master chamber 22 is hydraulically connected to the second hydraulic circuit 32 for pressurizing the second hydraulic circuit 32 in the emergency mode. Thus, the emergency or "no power" state of the system 10 puts the master cylinder 20 in hydraulic communication with the wheel brakes 31, 33 so that the driver's input to the brake pedal 14 directly causes braking.

When a user presses the brake pedal 14, the input rod 13 pushes the first master piston 23 further into the master cylinder 20. The second master piston 24 is urged into the second master chamber 22 and compresses spring 29. The pressure of the brake fluid inside the first master chamber 21, the second master chamber 22 is increased. This causes the first and second hydraulic circuits 30, 32 to be pressurized to operate the hydraulic wheel brakes 31, 33. After the braking action, the springs 15, 29 urge the first and second master pistons 23, 24, the input rod 13 and the brake pedal 14 back to their rest positions.

Preferably, the first pressure relief path 34 between the first hydraulic circuit 30 and the first master chamber 21 for depressurizing the first hydraulic circuit 30 in the normal operating mode includes the same hydraulic fluid line 34 as the hydraulic connection between the first hydraulic circuit 30 and the first master chamber 21 for pressurizing the first hydraulic circuit 30 in the emergency mode. Furthermore, the second pressure relief path 35 between the second hydraulic circuit 32 and the second master chamber 22 for depressurizing the second hydraulic circuit 32 in the normal operating mode differs from the hydraulic connection between the second hydraulic circuit 32 and the second master chamber 22 for pressurizing the second hydraulic circuit 32 in the emergency mode.

It should be mentioned that the solenoid valves 40, 40', 40'', 40''', 41, 42, 65 depicted in FIGS. 1 and 2 are shown in their default, non-powered states.

The wheel brakes 33 may comprise rear-left and front-right brakes, whereas the wheel brakes 31 may comprise rear-right and front-left brakes. Alternatively, the wheel brakes 33 may comprise rear-left and rear-right brakes, while the wheel brakes 31 may comprise front-left and front-right brakes.

Any features shown in the FIGS. 1-2 may be combined with each other or may be separately claimed.

The invention claimed is:

1. A brake system comprising:
   a brake pedal;
   a master cylinder including a first master chamber, a second master chamber, a first master piston, and a second master piston, the first master piston being directly displaceable by operating the brake pedal and the second master piston being a floating piston and separating the first master chamber, which is between the first master piston and the second master piston, from the second master chamber;
   a first hydraulic circuit including at least one first hydraulic wheel brake;
   a second hydraulic circuit including at least one second hydraulic wheel brake; and
   a hydraulic pressure supplier including an actuator for pressurizing the first hydraulic circuit and the second hydraulic circuit depending on an operation of the brake pedal in a normal operating mode of the brake system,
   wherein the first master chamber is hydraulically connected to the first hydraulic circuit for pressurizing the first hydraulic circuit in an emergency mode of the brake system,
   wherein the second master chamber is hydraulically connected to the second hydraulic circuit via a first cut-off valve for pressurizing the second hydraulic circuit in the emergency mode when the first cut-off valve is open, while the second master piston is configured to be locked in a locking position by closing the first cut-off valve in the normal operating mode, and
   wherein
   an elastic pedal feel element is arranged in the first master chamber and in contact with both of the first master piston and the second master piston, and
   a first axial end portion of the elastic pedal feel element in a recess of the first master piston has a diameter greater than a diameter of a second axial end portion of the elastic pedal feel element in a recess of the second master piston.

2. The brake system of claim 1, further comprising a reservoir for storing a brake fluid, the first master chamber being hydraulically connected to the reservoir via a second cut-off valve.

3. The brake system of claim 2, further comprising a control unit and a third cut-off valve arranged in a brake fluid supply path between the reservoir and an inlet of the first master chamber, the inlet being open when the first master piston is in a rest position and closed when the first master piston is moved out of the rest position by the brake pedal, wherein the control unit is configured for performing a self-test of the brake system by closing the third cut-off valve and by pressurizing the first master chamber and/or a seal region of the first master chamber in the normal operating mode.

4. The brake system of claim 3, wherein a pressure test path includes a hydraulic connection between the first master chamber and the first hydraulic circuit for pressurizing the first master cylinder and/or the seal region during the self-test.

5. The brake system of claim 3, wherein the inlet of the first master chamber is arranged between a primary sealing member and a secondary sealing member, the sealing members being disposed between the first master piston and an inner wall of the master cylinder.

6. The brake system of claim 5, further comprising an auxiliary sealing member disposed between the first master piston and the inner wall of the master cylinder, wherein a pressure test chamber is axially delimited by the auxiliary sealing member and the primary sealing member.

7. The brake system of claim 6, wherein a pressure test path includes a hydraulic connection between the reservoir and the pressure test chamber for depressurizing the pressure test chamber.

8. The brake system of claim 7, wherein the pressure test path between the reservoir and the pressure test chamber includes a fourth cut-off valve and/or a first check valve.

9. The brake system of claim 3, wherein the control unit is configured to simultaneously close the second cut-off valve and the third cut-off valve and to subsequently open the second cut-off valve after pressurizing the seal region during the self-test.

10. The brake system of claim 2, wherein a first pressure relief path for depressurizing the first hydraulic circuit in the normal operating mode hydraulically connects the first hydraulic circuit to the reservoir via the first master chamber and the second cut-off valve, a part of the first pressure relief path connecting the first master chamber to the first hydraulic circuit for pressurizing the first hydraulic circuit in the emergency mode.

11. The brake system of claim 2, further comprising a control unit, wherein the control unit is configured for keeping the first cut-off valve closed and the second cut-off valve open in the normal operating mode and/or for opening the first cut-off valve and closing the second cut-off valve in order to switch the brake system in the emergency mode when a failure is detected.

12. The brake system of claim 8, wherein the first cut-off valve is a normally open valve and/or wherein the second cut-off valve is a normally closed valve and/or wherein the third cut-off valve is a normally open valve and/or wherein the fourth cut-off valve is a normally closed valve.

13. The brake system of claim 8, wherein the first cut-off valve, the second cut-off valve and/or the fourth cut-off valve are electrically operated valves and/or that the third cut-off valve is a hydraulically operated valve.

14. The brake system of claim 6, further comprising a pressure sensor for measuring the pressure of the brake fluid in the pressure test chamber during the self-test.

* * * * *